United States Patent Office 3,118,931
Patented Jan. 21, 1964

3,118,931
POLYOXYAMINOALKYL AMINOBENZOATES
Max Matter, Muri, and Roland Glatthard, Bern, Switzerland, assignors to Ciba Corporation, a corporation of Delaware
No Drawing. Filed June 30, 1960, Ser. No. 39,803
Claims priority, application Switzerland July 2, 1959
13 Claims. (Cl. 260—472)

It is known that certain esters of para-butylaminobenzoic acid possess local anaesthetic properties. Of this group the 2-dimethylaminoethyl ester (Tetracain) and the (polyethylene glycol-monomethyl ether)-ester (Benzononantin) are preferred as medicaments. In the first mentioned ester solubility in water is due to the basic radical or its hydrochloride and in the second mentioned ester solubility in water is due to the polyether radical.

The present invention provides N-monosubstituted para-aminobenzoic acid esters which contain in the alcohol portion both a basic and a polyether radical, and physiologically tolerable salts of these esters. The compounds of this invention correspond to the general formula

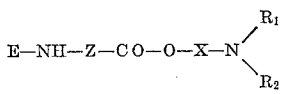

in which R represents a hydrocarbon radical of aliphatic character containing 3 to 7 carbon atoms, Z represents a phenylene-(1:4)-radical, X represents a lower alkylene radical containing at least two carbon atoms that separate the oxygen and nitrogen atoms from each other, $R_1$ represents an oxypolyethyleneoxyethyl radical containing 2 to 10 ethyleneoxy radicals and etherified with a lower alkanol, and $R_2$ has one of the meanings given for $R_1$ or represents a lower alkyl group.

In the new compounds the lower hydrocarbon radical of aliphatic character R is advantageously an alkyl, cycloalkyl or cycloalkyl-alkyl radical, such as a straight or branched propyl, butyl, pentyl, hexyl or heptyl radical, which residues may be bound at any position, or a cyclopentyl, cyclohexyl, cyclopentyl-methyl, cyclohexyl- methyl, cyclopentyl-ethyl, cyclohexyl-ethyl, methyl-cyclopentyl-methyl or cyclobutyl-propyl radical. The phenylene-(1:4)-radical Z is advantageously unsubstituted but may be substituted, advantageously, by a free hydroxyl group or a lower alkoxy radical, such as methoxy or ethoxy. These groups are advantageously present in ortho-position to the carboxyl group. The alkylene radical X advantageously contains 2 to 4 carbon atoms and is, for example, an ethylene, propylene-(1:3)-propylene-(1:2) or a butylene radical. The lower alkyl radical of the terminal ether group in the radical $R_1$, and, if desired, the lower alkyl radical $R_2$, are more especially methyl, ethyl, propyl or isopropyl groups.

The new esters of this invention possess valuable biological properties. They possess local anaesthetic properties and are stretch receptor anaesthetics. The extremely high activity of these compound is surprising. Nevertheless, they are well tolerated, for example, it has been found from the quotients of local irritation and local anaesthetic action that they have a very favorable therapeutic range. Especially valuable are compounds of the general formula

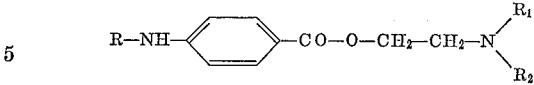

in which R represents the n-pentyl, n-hexyl or n-heptyl group or preferably the n-butyl group, $R_1$ has the formula

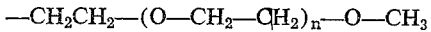

in which $n$ represents a whole number from 2 to 10, and especially 2, and $R_2$ has one of the meanings given for $R_1$ or represents the methyl group. Particularly valuable is the N:N-di-(methoxy-diethyleneoxy-ethyl)-aminoethyl ester of para-n-butylamino-benzoic acid of the formula

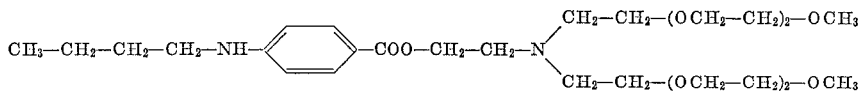

and physiologically tolerable salts thereof.

The new compounds can be made by methods in themselves known. Thus, a benzoic acid of the formula

R—NH—Z—COOH may be converted in the usual manner into an ester thereof with an alcohol of the formula

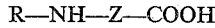

in which formulae R, Z, X, $R_1$ and $R_2$ have the meanings given above. For this purpose, for example, the aforesaid acid, if desired, in the form of a reactive functional derivative or salt thereof, is reacted with the aforesaid basic alcohol, if desired, in the form of a reactive functional derivative or salt thereof.

Thus the appropriate benzoic acid is reacted directly with the appropriate basic alcohol, advantageously with the use of an ordinary esterification catalyst, or the benzoic acid, for example, in the form of its anhydride, or halide or an ester thereof, with an easily volatile alcohol, is reacted with the appropriate basic alcohol, advantageously in the presence of a basic condensing agent, such as pyridine, sodium hydroxide or a metal alcoholate, if desired, a metal alcoholate of the appropriate basic alcohol.

Another process consists in converting in a compound of the formula

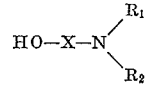

in which Z, X, $R_1$ and $R_2$ have the meanings given above, and Y represents a substituent convertible into the group R—NH defined above, the said group Y directly or in stages into the group R—NH—.

Y may be, for example, a free amino group which is alkylated in known manner, for example, by reaction with a reactive ester of an alcohol of the formula R—OH or by reduction in the presence of an oxo-compound that yields on reduction the aforesaid alcohol, or by reduction with the use of the corresponding Schiff's base. If desired, the amino group may be formed under the conditions of the reaction, for example, from a nitro group. Alternatively, a group of the formula

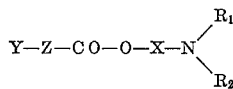

in which $R_3$ represents a group capable of being split off by hydrogenolysis, for example, a benzyl or carbobenzoxy radical, is converted by hydrogenolysis into the group —NH—R.

The reactions may be carried out in the presence or absence of a diluent and/or a condensing agent or a catalyst at the ordinary or raised temperature under atmospheric or superatmospheric pressure.

It is noteworthy that the new basic esters generally possess a good solubility in water even in the form of the free bases. Solutions of the free bases possess the characteristic property that, when they are heated at a certain temperature which depends on the concentration of the solution, they become cloudy. The temperature at which a solution of 10% strength becomes cloudy is hereinafter referred to as the turbidity point, and constitutes a physical constant that characterises the compound.

As compared with Tetracain, the basic esters of this invention have the advantage that aqueous solutions thereof can be prepared even at high pH-values, for example, of 6 to 8, without any fear of the active substance precipitating out. The pH value of such solutions can to a great extent be chosen as desired, by adding an acid such as hydrochloric acid or methane sulfonic acid to an aqueous solution of the free base. Such an aqueous solution at a pH value of 7 contains a mixture of the new basic ester in free form with the salt thereof with the corresponding acid. Thus, a solution of one of the new compounds can be adjusted to the pH-value of the biological tissue into which the compound is to be injected. Injury to the tissue can be avoided by adjusting the solution to the optimum pH-value. Moreover, it becomes possible to take advantage of the fact that local anaesthetics are more active at higher pH-values than they are at lower pH values.

The compounds used as starting materials are known or can be made by methods in themselves known. The starting materials of the formula

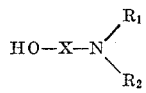

in which X, $R_1$ and $R_2$ have the meanings given above, are also included in the invention. They are obtained by reacting an amine of the formula HO—X—$NH_2$ with a reactive ester, for example, a halide or aryl sulfonic acid ester of an alsohol of the formula $R_1$—OH, and, if desired, alkylating the resulting alcohol of the formula HO—X—NH—$R_1$.

The invention includes any modification of the process in which there is used as starting material a compound obtainable as an intermediate product at any stage of the process, and the remaining steps of the process are carried out or, in which the starting material is formed under the conditions of the reaction, or it is used in the form of a salt thereof.

Depending on the procedure used the new compounds are obtained in the form of the free bases or as salts thereof. From the salts the bases can be obtained in the usual manner and the free bases may be converted by known methods into salts thereof. There are suitable for making therapeutically useful salts inorganic acids, for example, hydrohalic acids, sulfuric acids, phosphoric acids, nitric acid or perchloric acid; or organic acids, such as aliphatic, alicyclic, aromatic or heterocyclic carboxylic or sulfonic acids, such as formic acid, acetic acid, propionic acid, oxalic acid, succinic acid, glycollic acid, lactic acid, malic acid, tartaric acid, citric acid, ascorbic acid, hydroxymaleic acid, dihydroxymaleic acid or pyroracemic acid; phenyl-acetic acid, benzoic acid, para-aminobenzoic acid, anthranilic acid, para-hydroxybenzoic acid, salicylic acid or para-aminosalicyclic acid, methane sulfonic acid, ethane sulfonic acid, oxyethane sulfonic acid, ethylene sulfonic acid, toluene or naphthalene sulfonic acids or sulfanilic acid; methionine, tryptophane, lysine, arginine, crystein or glutamic acid. Salts so obtained may be converted into the free bases, and the free bases may be converted into salts thereof.

The new compounds are useful as medicaments in human and veterinary medicine. They can be used, for example, in the form of pharmaceutical preparations which contain such a compound or salt thereof in admixture with a pharmaceutical organic or inorganic carrier suitable for enteral, parenteral or topical administration. For making carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other carriers known for medicaments. Pharmaceutical preparations may be in the form, for example, of tablets, dragées, salves, creams or any liquid form as solutions, suspensions or emulsions. If desired, they may be sterilized and/or may contain auxiliary substances, such as preserving, stabilizing, wetting, or emulsifying agents, salts for controlling osmotic pressure or buffers. They may also contain other therapeutical substances. The preparations are made by the usual methods.

The following examples illustrate the invention.

*Example 1*

In a vacuum distillation apparatus equipped with a descending condenser and a dropping funnel which reaches down to the bottom of the still a mixture is prepared of 9.9 grams of N-(methoxy-diethyleneoxy-ethyl)-N-methyl-aminoethanol, 6.6 grams of para-n-butylaminobenzoic acid ethyl ester, 0.24 gram of a fine dispersion of 50% strength of sodium hydride in paraffin oil and 40 cc. of absolute toluene. The still is evacuated to a pressure of 90–100 mm. Hg and the toluene is slowly distilled off by heating in an oil bath at 100–110° C. Part of the basic alcohol is converted by the sodium hydride into the sodium salt with evolution of hydrogen, whereby the transesterification is catalytically accelerated. The ethanol forming as the reaction proceeds is continuously distilled off together with the toluene. To complete the reaction the last remnants of toluene are removed by evacuation to a pressure of 10–20 mm. Hg. Two additions of 40 cc. each of absolute toluene are then made, the whole is distilled and completely evaporated as described above. The residue is taken up in benzene and washed with saturated sodium bicarbonate solution and then with sodium carbonate solution of 10% strength. After the benzene has been distilled off there are obtained 13 grams of almost pure N-(methoxy-diethyleneoxy-ethyl)-N-methyl-aminoethanol ester of para-n-butylaminobenzoic acid of the formula

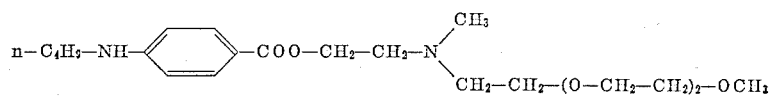

in the form of a pale-yellowish oil which can be purified by being distilled in a high vacuum of 0.01 mm. Hg at 200–210° C. or by being taken up in 150 cc. of ether+petroleum ether 1:2 and filtered through a column of 50 grams of neutral alumina of activity I. Elution with ether+petroleum ether 1:2 followed by evaporation yields the almost colorless ester in an oily form; reflection index $n_D^{20}=1.5312$.

The solubility in water depends very much on the temperature. By digestion with 10 times the amount of water a clear solution is obtained at a temperature below 2–3° C., while above this temperature two layers are formed since the new basic ester is very sparingly soluble in water at a higher temperature. This temperature limit, in the present example 2–3° C., is referred to as the turbidity point.

An ester prepared in this manner may sometimes still contain a small amount of ethyl ester used as starting material which can be removed in the following manner: The product is dissolved in 100 times its own weight of water, the solution is adjusted with N-hydrochloric acid to pH=3.5 and agitated three times with 30 times the amount of ether. The dissolved ester is then removed under vacuum from the aqueous solution and adjusted with N-sodium hydroxide solution to pH=6. The resulting aqueous solution is completely clear and colorless and contains in addition to a small amount of sodium chloride a mixture of the new basic ester in its free form and in the form of its hydrochloride. The solution can be used as it is for local anaesthetics. To prepare the free base the solution is adjusted with sodium carbonate to pH=9 to 9.5, the oily precipitate is taken up in ether, dried with sodium sulfate and the ether is evaporated.

The basic alcohol used as starting material in the above transesterification can be prepared in the following manner: 1150 grams of triethylene glycol monomethyl ether (boiling at 131–133° C. under 13 mm. Hg pressure) are treated with 20 grams of adsorptive carbon and 750 cc. of absolute benzene in a round-bottomed flask equipped with reflux condenser and dropping funnel and treated within one hour with 725 cc. of thionyl chloride with exclusion of moisture, whereby the reaction mixture is caused to boil. The mixture is refluxed overnight. The excess of thionyl chloride and the benzene are then distilled off under a partial vacuum. The residue is filtered through fine kieselguhr, washed with a small amount of ether and distilled under a pressure of 10 mm. Hg, to yield 895 grams of a pale-yellow oil boiling at 95–110° C. under a pressure of 10 mm. Hg.

The product can be purified by fractional distillation, for example with a distillation column having a diameter of 25 mm. and a height of 1200 mm., filled with wire fabric rings of chrome-nickel steel with cross-stay of 3 mm. diameter, 2700 mesh per sq. cm., insulated with a silver plated vacuum shell and equipped with a dephlegmator. Distillation is carried out under a pressure of 9 mm. Hg to yield at 80–104° C., at a ratio of distillate:reflux=1:5, 65 grams of forerunnings. The distillation is then continued at a reflux ratio of 1:2 whereby at a B.P. of 104° C. under 9 mm. Hg pressure there are obtained 700 grams of colorless methoxy-diethyleneoxy-ethyl chloride of the formula $$CH_3O—(CH_2CH_2O)_2—CH_2—CH_2—Cl$$

in a chemically pure form. Refraction index $$n_{20}{}^D = 1.4408$$

109 grams of the above product are stirred dropwise within one hour into 40 grams of ethanolamine which is heated on a steam bath. The mixture is heated for a further hour at 100° C., cooled to 20–30° C., and a solution of 36 grams of potassium hydroxide in 70 cc. of water is slowly added. The reaction mixture is repeatedly distributed between chloroform and semi-saturated potassium carbonate solution, the combined chloroform solutions are dried with potassium carbonate and evaporated, to yield 90 grams of a brown oil which consists of a mixture of N-(methoxy-diethyleneoxy-ethyl)-aminoethanol of the formula

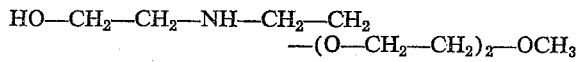

and N:N - di - (methoxy - diethyleneoxy - ethyl) - aminoethanol of the formula

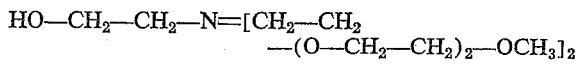

The former compound is methylated at the nitrogen atom as it is in the aforementioned crude mixture by being heated for 14 hours with 55 grams of formic acid of 98–100% strength and 45 grams of formaldehyde of 39% strength. To work up the reaction mixture it is again repeatedly distributed between chloroform and semi-saturated aqueous potassium carbonate solution. The chloroform layers are combined, dried with potassium carbonate, evaporated and dried under vacuum at 100° C. to leave a brown oil. When this oil is subjected to fractional distillation in a high vacuum it yields 42 grams of N-(methoxy-diethyleneoxy-ethyl)-N-methyl-aminoethanol in the form of a colorless oil boiling at 85° C. under 0.01 mm. Hg pressure, refraction index $n_{20}{}^D = 1.4510$, as well as 40 grams of N:N-di-(methoxy-diethyleneoxy-ethyl)-aminoethanol as a colorless oil boiling at 163° C. under 0.01 mm. Hg pressure, refraction index $n_{20}{}^D = 1.4588$.

*Example 2*

In the apparatus described in Example 1 a mixture is prepared of 4.4 grams of para-n-butylaminobenzoic acid ethyl ester and 10.6 grams of the N:N-di-(methoxy-diethyleneoxy-ethyl)-aminoethanol described in Example 1 and 0.36 cc. of a 4 N-methanolic solution of sodium methylate. The transesterification is completed as described in Example 1 by repeated addition and distillation of absolute toluene with heating at 100–110° C. The reaction product is repeatedly distributed between benzene and 2 N-sodium carbonate solution and the combined benzene layers are evaporated to yield 11 grams of a yellow oil. For purification it can be taken up in ether+petroleum ether 1:2, filtered through 5 times its own weight of alumina (column) and eluted with ether+petroleum ether 1:2. Yield: 6 grams of a slightly yellowish oil having a refraction index $n_{20}{}^D = 1.5166$; it is the analytically pure N:N-di-(methoxy-diethyleneoxy-ethyl)-aminoethanol ester of para-n-butylaminobenzoic acid of the formula

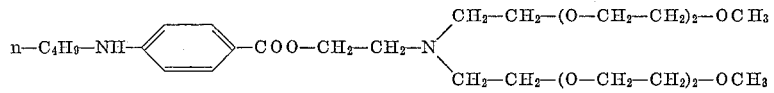

An aqueous solution of 10% strength of this ester turns turbid at 26° C.

When the transesterification is not performed quite quantitatively, the final product still contains some para-butylaminobenzoic acid ethyl ester which is easy to isolate quantitatively as described in Example 1.

Instead of the method for the manufacture of N:N-di-(methoxy - diethyleneoxy - ethyl)-aminoethanol described in Example 1 the following method may be used: A mixture of 475 grams of methoxy-diethyleneoxy-ethyl chloride (see Example 1) and 600 grams of aqueous ammonium of 34% strength and 250 cc. of isopropanol is heated in a stirring autoclave for 20 hours at 120–130° C. The reaction mixture is allowed to cool and then poured into a round-bottomed flask. After rinsing with 100 cc. of water, 155 grams of potassium hydroxide are added. A large proportion of ammonia is expelled by refluxing on a steam bath. 150 grams of potassium carbonate are then added and the whole is heated for 2 hours at 100° C., whereby some more ammonia is expelled. Two layers have formed: The supernatant layer, which contains isopropanol and the bulk of the organic bases, is separated and the lower aqueous layer is agitated twice with 200 cc. of isopropanol+chloroform in a volumetric ratio of 1:4. The organic phases are washed successively twice with 100 cc. of saturated potassium carbonate solution. The organic phases are combined, dried with potassium carbonate and evaporated, to yield a crude amine mixture which can be separated by fractional distillation. Yield: 123 grams of twice-distilled analytically pure methoxy-diethyleneoxy-ethylamine boiling at 106° C. under a pressure of 11 mm. Hg, refractive index $n_{20}{}^D = 1.4395$, in the form of a colorless oil, as well as 140 grams of twice-distilled di-(methoxy-diethyleneoxy-ethyl)-amine boiling at 151° C. under 0.02 mm. Hg pressure, refractive index $n_{20}{}^D = 1.4485$. When the latter compound is reacted in an autoclave with slightly more than the theoretical amount of ethylene oxide, a substantially theoretical yield of N:N-di-(methoxy-diethyleneoxy-ethyl)-aminoethanol is obtained.

Example 3

A mixture of 6.6 grams of para-n-butylaminobenzoic acid ethyl ester, 10.6 grams of γ-[N-methyl-N-(methoxy-diethyleneoxy-ethyl)-amino]-propanol and 0.054 gram of sodium methylate is subjected to transesterification as described in Example 1. Working up yields an oily crude product which is obtained in analytically pure form after distillation in a high vacuum. The new γ-[N-methyl-N-(methoxy-diethyleneoxy-ethyl)-amino]-propanol ester of para-n-butylaminobenzoic acid of the formula

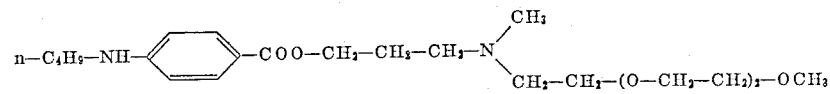

boils at 211° C. under 0.01 mm. Hg pressure and forms a slightly yellowish oil. Refractive index $n_{20}{}^D = 1.5285$. Turbidity point of an aqueous solution of 10% strength: 2° C.

The basic alcohol used as starting product can be prepared as described for the starting product in Example 1, using instead of ethanolamine an equivalent amount of γ-aminopropanol. The analytically pure basic alcohol boils at 95° C. under 0.01 mm. Hg. Refractive index $n_{20}{}^D = 1.4536$.

Example 4

A mixture of 4.4 grams of para-n-butylaminobenzoic acid ethyl ester, 11 grams of γ-[N:N-di-(methoxy-diethyleneoxy-ethyl)-amino]-propanol and 0.036 gram of sodium methylate is subjected to transesterification as described in Example 1. Working up yields an oily crude product which can be obtained in an analytically pure form with the aid of alumina as described in Example 1. The new γ-[N:N-di-(methoxy-diethyleneoxy-ethyl)-amino]-propanol ester of para-n-butylaminobenzoic acid of the formula

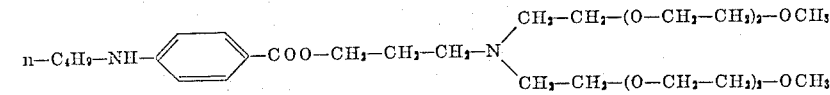

forms a slightly yellowish oil. Refractive index $n_{20}{}^D = 1.5130$. Turbidity point of an aqueous solution of 10% strength: 26° C.

The basic alcohol used as starting product can be prepared in the manner described for the starting product in Example 1, using instead of ethanolamine an equivalent amount of γ-aminopropanol. The analytically pure basic alcohol boils at 165° C. under 0.01 mm. Hg. Refractive index $n_{20}{}^D = 1.4601$.

Example 5

A mixture of 4.4 grams of para-n-butylaminobenzoic acid ethyl ester, 10.6 grams of N-methyl-N-(methoxy-pentaethyleneoxy-ethyl)-aminoethanol and 0.036 gram of sodium methylate is subjected to transesterification as described in Example 1. Working up yields an oily product which can be obtained in an analytically pure form with the aid of alumina as described in Example 1. The new N-methyl-N-(methoxy-pentaethyleneoxy-ethyl)-aminoethanol ester of para-n-butylaminobenzoic acid of the formula

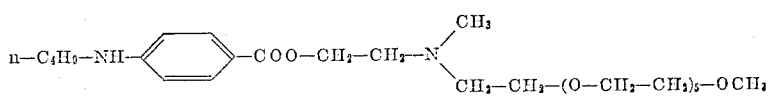

forms a slightly yellowish oil. Refractive index $n_{20}{}^D = 1.5168$. Turbidity point of an aqueous solution of 10% strength: 36° C.

The basic alcohol used as starting product can be prepared in the following manner: A round-bottomed flask is charged with 7.3 grams of ethanolamine and in the course of one hour at 60° C. 25.9 grams of the benzene-sulfonic acid ester of hexaethyleneglycol monomethyl ether are stirred in dropwise. The mixture is stirred for 3 hours at 60° C. and a solution of 3 grams of potassium hydroxide in 50 cc. of water is added. The reaction mixture is repeatedly distributed between chloroform and semi-saturated potassium carbonate solution, and the chloroform solutions are combined, dried with potassium carbonate and evaporated, to leave 18.8 grams of a yellow oil which consists of a mixture of N-(methoxy-penta-ethyleneoxy-ethyl)-aminoethanol of the formula

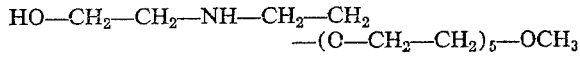

and N:N-di-(methoxy-pentaethyleneoxy-ethyl)-aminoethanol of the formula

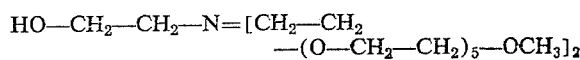

The former compound is methylated at the nitrogen atom as it is in this crude mixture by being refluxed for 20 hours with 6.4 grams of formic acid of 98–100% strength and 5.5 grams of formaldehyde of 39% strength. The reaction mixture is worked up by being repeatedly distributed between chloroform and semi-saturated aqueous potassium carbonate solution. The chloroform layers are combined, dried with potassium carbonate, evaporated and dried under vacuum at 100° C., to yield a yellow oil; when it is subjected to fractional distillation in a high vacuum it yields 9 grams of N-methyl-N-(methoxy-pentaethyleneoxy-ethyl)-aminoethanol in the form of a yellowish oil boiling at 158° C. under 0.01 mm. Hg pressure. Refractive index $n_{20}{}^D = 1.4602$.

Example 6

A mixture of 4.4 grams of para-n-butylaminobenzoic acid ethyl ester, 14.5 grams of N-methyl-N-(methoxy-octaethyleneoxy-ethyl)-aminoethanol and 0.036 gram of sodium methylate is subjected to transesterification as described in Example 1. Working up yields an oily product which can be obtained in an analytically pure form with the aid of alumina as described in Example 1. The new N - methyl-N-(methoxy-octaethyleneoxy-ethyl)aminoethanol ester of para-n-butylaminobenzoic acid of the formula

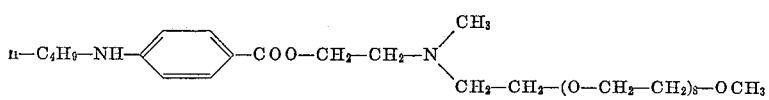

forms a slightly yellowish oil. Refractive index $n_{20}^D = 1.5086$. Turbidity point of an aqueous solution of 10% strength: 54° C.

The basic alcohol used as starting product can be prepared as described for the starting product in Example 5, using instead of the benzenesulfonic acid ester of hexaethyleneglycol monomethyl ether an equivalent amount of the benzenesulfonic acid ester of nonaethyleneglycol monomethyl ether. The analytically pure basic alcohol boils at 210° C. under 0.01 mm. Hg pressure. Refractive index $n_{20}^D = 1.4630$.

Example 7

A mixture of 15 grams of N-methyl-N-(methoxydiethyleneoxy-ethyl)aminoethanol, 9.3 grams of para-n-propylaminobenzoic acid ethyl ester and 0.24 gram of a sodium hydride dispersion of 50% strength is subjected to transesterification as described in Example 1 and then worked up. There are obtained 14.5 grams of the N-methyl-N-(methoxy - diethyleneoxy-ethyl)aminoethanol ester of para-n-propylaminobenzoic acid of the formula

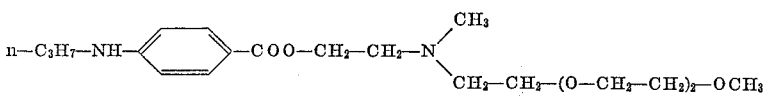

as a slightly yellowish oil. Refractive index $n_{20}^D = 1.5329$. Turbidity point of an aqueous solution of 10% strength: 9° C.

Example 8

A mixture of 11 grams of N:N-di-(methoxy-diethyleneoxy-ethyl)-aminoethanol, 4.1 grams of para-n-propylaminobenzoic acid ethyl ester and 0.1 gram of a sodium hydride dispersion of 50% strength is subjected to transesterification as described in Example 1 and then worked up, to yield 7.4 grams of the N:N-di-(methoxy-diethyleneoxy-ethyl)-aminoethanol ester of para-n-propylaminobenzoic acid of the formula

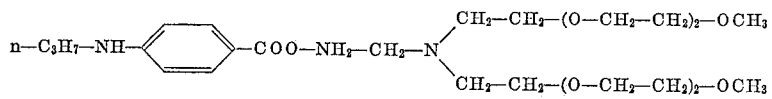

as a slightly yellowish oil. Refractive index $n_{20}^D = 1.5173$. Turbidity point of an aqueous solution of 10% strength: 30° C.

Example 9

A mixture of 5.3 grams of para-n-heptylaminobenzoic acid ethyl ester, 6.7 grams of N-methyl-N-(methoxy-diethyleneoxy-ethyl)-aminoethanol and 0.1 gram of a sodium hydride dispersion of 50% strength is subjected to transesterification as described in Example 1 and then worked up, to yield 6.5 grams of the N-methyl-N-(methoxy-diethyleneoxy-ethyl)-aminoethanol ester of para-n-heptylaminobenzoic acid of the formua

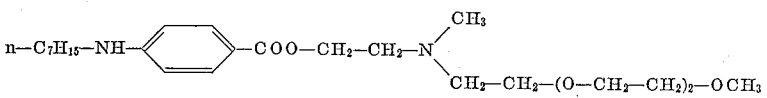

as a slightly yellowish oil. Refractive index $n_{20}^D = 1.5205$. The new ester gives a clear solution in dilute hydrochloric acid. The free base is soluble in water up to 1% at 0° C., but insoluble at a higher temperature.

Example 10

A mixture of 5.2 grams of para-n-heptylaminobenzoic acid ethyl ester, 10.6 grams of N:N-di-(methoxy-diethyleneoxy-ethyl)-aminoethanol and 0.1 gram of a sodium hydride dispersion of 50% strength is subjected to transesterification as described in Example 1 and worked up, to yield 8 grams of the N:N-di-(methoxy-diethyleneoxy-ethyl)-aminoethanol ester of para-n-heptylaminobenzoic acid of the formula

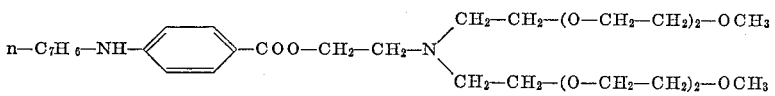

as a colorless oil. Refractive index $n_{20}^D = 1.5116$. Turbidity point of an aqueous solution of 10% strength: 21° C.; turbidity point of a solution of 1% strength: 28° C.

Example 11

A mixture of 7.8 grams of para-cyclohexylmethylaminobenzoic acid ethyl ester, 10 grams of N-methyl-N-(methoxy-diethyleneoxy-ethyl)-aminoethanol and 0.15 gram of a sodium hydride dispersion of 50% strength is subjected to transesterification as described in Example 1 and worked up, to yield 8 grams of the N-methyl-N-

(methoxy-diethyleneoxy-ethyl)-aminoethanol ester of para-cyclohexyl-methyl-aminobenzoic acid of the formula

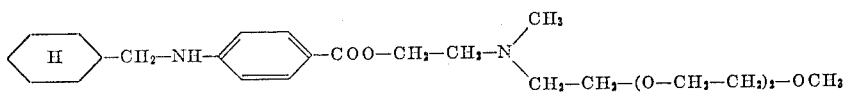

as a colorless oil. Refractive index $n_{20}^D = 1.5382$. Turbidity point of an aqueous solution of 1% strength: 3° C.

*Example 12*

A mixture of 5.2 grams of para-cyclohexylmethyl-aminobenzoic acid ethyl ester, 10.6 grams of N:N-di-(methoxy-diethyleneoxy-ethyl)-aminoethanol and 0.1 gram of a sodium hydride dispersion of 50% strength is subjected to transesterification as described in Example 1 and worked up, to yield 9.4 grams of the N:N-di-(methoxy-diethyleneoxy-ethyl)-aminoethanol ester of para-cyclohexylmethylaminobenzoic acid of the formula

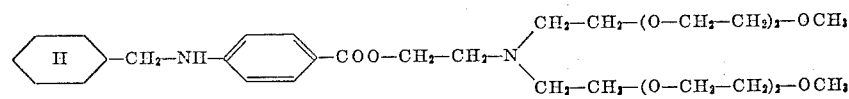

as a colorless oil. Refractive index $n_{20}^D = 1.5232$. Turbidity point of an aqueous solution of 10% strength: 20° C.; turbidity point of a solution of 1% strength 27° C.

*Example 13*

2 grams of para-nitrobenzoyl chloride are refluxed for a short time in a solution of 2.2 grams of N-methyl-N-(methoxy-diethyleneoxy-ethyl)-aminoethanol in 20 cc. of absolute ether, and the mixture is then cooled to 20° C. and agitated with 50 cc. of 2 N-hydrochloric acid. The aqueous layer is washed with fresh ether, filtered, rendered alkaline with potassium carbonate and extracted with ether. The ether solution is dried with sodium sulfate and evaporated, to yield the N-methyl-N-(methoxy-diethyleneoxy-ethyl)-aminoethanol ester of para-nitrobenzoic acid which boils at 190° C. under 0.01 mm. Hg. A mixture of 3.7 grams of this ester with 0.8 gram of butyraldehyde, 0.5 gram of sodium acetate and 1 gram of Raney nickel in ethanol is hydrogenated at room temperature. When 0.04 mol of hydrogen has been consumed, the mixture is worked up by being filtered, washed with ethanol and the combined filtrates are evaporated. The residue (3.1 grams) consists of the N-methyl-N-(methoxy-diethyleneoxy-ethyl)-aminoethanol ester of para-butylaminobenzoic acid. It can be chromatographed on alumina with ether +petroleum ether. It has the refractive index $n_{20}^D = 1.5312$ and is identical with the product obtained in Example 1.

*Example 14*

1.56 grams of para-aminobenzoyl chloride are refluxed for a short time in 50 cc. of absolute ether containing 0.4 gram of hydrogen chloride and 2.22 grams of N-methyl-N-(methoxy-diethyleneoxy-ethyl)-aminoethanol and then agitated with 40 cc. of 2 N-sodium carbonate solution. The ether solution is evaporated and the residue, which consists of the N-methyl-N-(methoxy-diethyleneoxy-ethyl)-aminoethanol ester of para-aminobenzoic acid, is taken up in ethanol. 0.75 gram of butyraldehyde is added and hydrogenation is performed in the presence of a catalytic amount of platinum oxide and of 1 gram of potassium acetate under hydrogen with agitation. After filtration and evaporation 2.9 grams of the N-methyl-N-(methoxy-diethyleneoxy-ethyl)-aminoethanol ester of para-butylaminobenzoic acid are obtained which can be purified by distillation under 0.01 mm. Hg pressure and is identical with the product described in Example 1.

*Example 15*

A mixture of 2.7 grams of N-benzyl-para-n-propyl-aminobenzoic acid, 30 cc. of benzene and 7 cc. of thionyl chloride is refluxed for several hours, then evaporated under vacuum at 40–50° C., and a solution of 2.23 grams of N-methyl-N-(methoxy-diethyleneoxy-ethyl)-aminoethanol in 30 cc. of benzene is added. The whole is refluxed for one hour, then cooled and agitated with 30 cc. of 2 N-sodium carbonate solution. The benzene is evaporated under vacuum and the residue, consisting of the N-methyl-N-(methoxy-diethyleneoxy-ethyl)-aminoethanol ester of N-benzyl-para-n-propylaminobenzoic acid, is hydrogenated in 30 cc. of glacial acetic acid in the presence of 1 gram of palladium carbon of 5% strength, whereby the benzyl residue is eliminated as toluene and the N-methyl-N-(methoxy-diethyleneoxy-ethyl)-aminoethanol ester of para-n-propylbenzoic acid is formed. For purification it is taken up in 150 cc. of ether, the solution is filtered and shaken with 150 cc. of 5 N-sodium hydroxide solution while cooling internally with ice. The new ester remains dissolved in ether and can be distilled in a high vacuum; it boils at 190–200° C. under 0.01 mm. Hg pressure and is identical with the product described in Example 7.

What we claim is:

1. A member selected from the group consisting of a compound of the formula

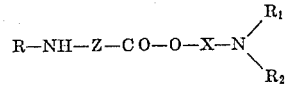

in which R is an aliphatic substituent having from 3 to 7 carbon atoms and being selected from the group consisting of lower alkyl, cycloalkyl and cycloalkyl-lower alkyl, cycloalkyl having from four to six carbon atoms, Z is a member selected from the group consisting of an 1,4-phenylene group selected from the group consisting of 1,4-phenylene, 1,4-phenylene substituted by hydroxyl, and 1,4-phenylene substituted by lower alkoxy, X stands for lower alkylene separating the oxygen atom and the nitrogen atom by at least two carbon atoms, $R_1$ stands for 2-(lower alkoxy-polyethyleneoxy)-ethyl having from 2 to 10 ethyleneoxy portions, and $R_2$ is a member selected from the group consisting of 2-(lower alkoxy-polyethyleneoxy)-ethyl having from 2 to 10 ethyleneoxy portions and lower alkyl, and physiologically tolerable acid addition salts of these compounds.

2. A compound of the formula

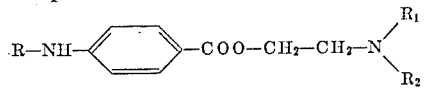

in which R is lower n-alkyl having from four to seven carbon atoms, and each of the groups $R_1$ and $R_2$ is a group of the formula $$-CH_2-CH_2-(O-CH_2-CH_2)_n-O-CH_3$$

in which $n$ is a whole number from 2 to 10.

3. A compound of the formula

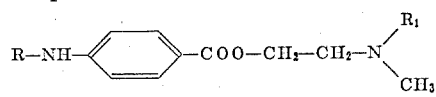

in which R is lower n-alkyl having from four to seven carbon atoms, and $R_1$ is a group of the formula $$-CH_2-CH_2-(O-CH_2-CH_2)_n-O-CH_3$$

in which $n$ is a whole number from 2 to 10.

4. The N:N-di-(methoxy-diethyleneoxy-ethyl)-aminoethanol ester of para-n-butylamino-benzoic acid of the formula

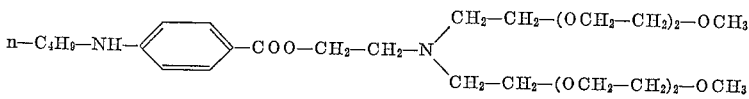

5. The N-(methoxy-diethyleneoxy-ethyl)-N-methyl-aminoethanol ester of para-n-butylaminobenzoic acid of the formula

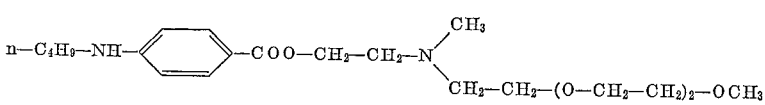

6. The γ-[N-methyl-N-(methoxy-diethyleneoxy-ethyl)-amino]-propanol ester of para-n-butylaminobenzoic acid of the formula

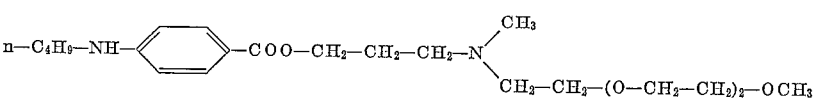

7. The γ-[N:N-di-(methoxy-diethyleneoxy-ethyl)-amino]-propanol ester of para-n-butylaminobenzoic acid of the formula

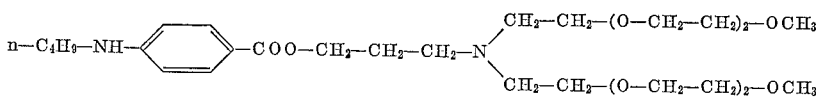

8. The N-methyl-N-(methoxy-diethyleneoxy-ethyl)-aminoethanol ester of para-(n)-propylaminobenzoic acid of the formula

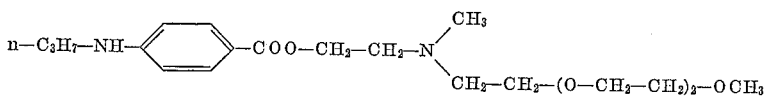

9. The N:N-di-(methoxy-diethyleneoxy-ethyl)-aminoethanol ester of para-(n)-propylaminobenzoic acid of the formula

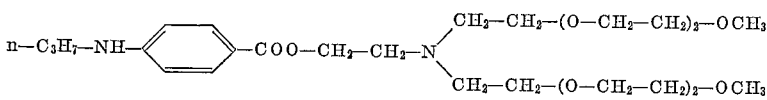

10. A member selected from the group consisting of a compound of the formula

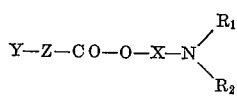

in which Y is a member selected from the group consisting of nitro, amino, N-benzyl-N-R-amino and N-carbobenzoxy-N-R-amino, wherein R is an aliphatic substituent having from 3 to 7 carbon atoms, selected from the group consisting of lower alkyl, cycloalkyl and cycloalkyl-lower alkyl, cycloalkyl having from four to six carbon atoms, Z is a member selected from the group consisting of an 1,4-phenylene group selected from the group consisting of 1,4-phenylene, 1,4-phenylene substituted by hydroxy, and 1,4-phenylene substituted by lower alkoxy, X stands for lower alkylene separating the oxygen atom and the nitrogen atom by at least two carbon atoms, $R_1$ stands for 2-(lower alkoxy-polyethyleneoxy)-ethyl having from 2 to 10 ethyleneoxy portions, and $R_2$ is a member selected from the group consisting of 2-(lower alkoxy-polyethyleneoxy)-ethyl having from 2 to 10 ethyleneoxy portions and lower alkyl, and physiologically tolerable acid addition salts of these compounds.

11. The N-methyl-N-(methoxy-diethyleneoxy-ethyl)-aminoethanol ester of para-nitrobenzoic acid.

12. The N-methyl-N-(methoxy-diethyleneoxy-ethyl)-aminoethanol ester of para-aminobenzoic acid.

13. The N-methyl-N-(methoxy-diethyleneoxy-ethyl)-aminoethanol ester of N-benzyl-para-n-propylaminobenzoic acid.

References Cited in the file of this patent

UNITED STATES PATENTS

| | | |
|---|---|---|
| 2,302,388 | Hester | Nov. 17, 1942 |
| 2,456,556 | Cope | Dec. 14, 1948 |
| 2,699,452 | Wilkes et al. | Jan. 11, 1955 |
| 2,717,270 | Bindler | Sept. 6, 1955 |
| 2,780,641 | Reiner | Feb. 5, 1957 |

FOREIGN PATENTS

| | | |
|---|---|---|
| 930,329 | Germany | July 14, 1955 |
| 935,130 | Germany | Nov. 10, 1955 |